US007358467B2

(12) United States Patent
Yang et al.

(10) Patent No.: US 7,358,467 B2
(45) Date of Patent: Apr. 15, 2008

(54) ELECTRIC POWER SUPPLY APPARATUS AND INDUCTION HEATING APPARATUS

(75) Inventors: Yue Yang, Hiratsuka (JP); Fumiaki Ikuta, Hiratsuka (JP); Shinichi Takase, Hiratsuka (JP); Gorou Atsuta, Hiratsuka (JP)

(73) Assignee: Neturen Co., Ltd., Tokyo (JP)

( * ) Notice: Subject to any disclaimer, the term of this patent is extended or adjusted under 35 U.S.C. 154(b) by 120 days.

(21) Appl. No.: 10/568,445

(22) PCT Filed: Aug. 19, 2004

(86) PCT No.: PCT/JP2004/011906

§ 371 (c)(1),
(2), (4) Date: Feb. 15, 2006

(87) PCT Pub. No.: WO2005/018085

PCT Pub. Date: Feb. 24, 2005

(65) Prior Publication Data

US 2006/0290295 A1 Dec. 28, 2006

(30) Foreign Application Priority Data

Aug. 19, 2003 (JP) ............................ 2003-207862

(51) Int. Cl.
*H05B 6/10* (2006.01)
*H02M 7/48* (2007.01)

(52) U.S. Cl. ...................... 219/662; 219/663; 219/666; 363/17; 363/97

(58) Field of Classification Search ........ 219/661-668; 363/17, 21, 95-98
See application file for complete search history.

(56) References Cited

U.S. PATENT DOCUMENTS 3,419,792 A 12/1968 Kasper et al.
4,300,031 A * 11/1981 Reboux et al. ............. 219/617
4,886,952 A 12/1989 Horiuchi

FOREIGN PATENT DOCUMENTS

| | | |
|---|---|---|
| EP | 0 295 099 A2 | 12/1988 |
| JP | A 11-262265 | 9/1999 |
| JP | B2 3150968 | 1/2001 |
| JP | A 2001-112268 | 4/2001 |
| JP | A 2002-171766 | 6/2002 |
| JP | A 2002-367763 | 12/2002 |

* cited by examiner

*Primary Examiner*—Philip H. Leung
(74) *Attorney, Agent, or Firm*—Oliff & Berridge, PLC

(57) ABSTRACT

A converter (311) converts an AC electric power (e) to the DC electric power with a DC voltage value corresponding to a setting. An inverter (312) is controlled by a frequency electric power control circuit (330) to convert the DC electric power to a dual frequency AC electric power for alternately outputting low and high frequencies at a frequency ratio (duty) corresponding to the setting. A matching transformer (321) having a tap (321C) at which the resonance impedance corresponds to the output impedance of a generator (310) receives the dual frequency AC electric power. A low-frequency series resonance circuit (325) or a high-frequency series resonance circuit (326) is caused to provide a series resonance, thereby causing an induction heating coil (200) to induction heat a workpiece-to-be-heated (201). In this way, the single generator (310) and the single induction heating coil (200) are used to effectively induction heat the workpiece-to-be-heated (201) by means of the dual frequency resonance.

14 Claims, 6 Drawing Sheets

ELECTRIC POWER SUPPLY APPARATUS AND INDUCTION HEATING APPARATUS

TECHNICAL FIELD

The present invention relates to an electric power supply apparatus capable of supplying electric power with different frequencies and an induction heating apparatus.

BACKGROUND ART

To control the output of a single induction load, such as an induction motor, an induction heating apparatus etc., there have been conventionally known electric power supply apparatuses capable of changing the frequency of an AC electric power supplied to the load (refer to, for example, Patent Document 1).

The electric power supply apparatus according to the Patent Document 1 includes a first converter which supplies a high-frequency and a second converter which supplies a medium-frequency, both converters being connected in parallel with a single induction coil. In other words, the first converter, which supplies the high-frequency, serves as a series resonance circuit, in which feedback of the medium-frequency from the second converter, which supplies medium-frequency, is reduced by a capacitor for compensating the reactive power of the induction coil. Further, a capacitor is connected in parallel with the second converter to compensate the reactive power of the induction coil, and a series circuit constituted by a reactor for restraining feedback of the high-frequency and a capacitor for additionally compensating the reactive power of the reactor is connected in series between the second converter and a common contact of the first converter and the second converter.

[Patent Document 1] Japanese Patent No. 3150968 (right column of page 2 to right column of page 3, and FIG. 3)

DISCLOSURE OF THE INVENTION

Problems to be Solved by the Invention

However, since the electric power supply apparatus according to the Patent Document 1 needs to be provided with an electric power source (namely a converter) for supplying two different frequencies of the high-frequency, which is supplied by the first converter, and the medium-frequency, which is supplied by the second converter, there is a desire for simplifying the configuration. Further, due to the mutual interference between the converters which simultaneously operate to supply different frequencies, designing for such an apparatus will be difficult. Specifically, due to the effect of AC ripple of the low-frequency, the frequency synchronizing circuit of the converter on the high-frequency side will be subject to dispersion in frequency, namely subject to unstable synchronization. To restrain the effect of the mutual interference, each of the matching circuits needs to be added with a filter circuit, and further, the circuits of two frequencies need to be arranged separately from each other as far as possible. With such a configuration, circuit will become complicated, the apparatus will become large, manufacture can not be facilitated, and the apparatus cost can not be reduced. Further, due to restriction in frequency setting, versatility can not be expanded.

In view of the above disadvantages, it is an object of the present invention to provide, with simple configuration, an electric power supply apparatus capable of supplying electric power with different frequencies and an induction heating apparatus.

Means for Solving the Problems

The electric power supply apparatus according to a first aspect of the present invention is an electric power supply apparatus for supplying electric power with different frequencies to an induction load to make the induction load work. The electric power supply apparatus includes: a generator that outputs AC electric power with different frequencies; a matching circuit that constitutes, together with the induction load, a plurality of resonance circuits corresponding to the different frequencies; and a control circuit that controls the supply of the AC electric power output from the generator to one of the resonance circuits of the matching circuit so that the frequency of the AC electric power matches a predetermined resonance frequency.

With such a configuration, the control circuit controls the output of the AC electric power with different frequencies output from the generator according to different frequencies of the AC electric power output from the generator, so that the plurality of resonance circuits of the matching circuit constituted including the induction load resonate respectively at the predetermined resonance frequencies. Thus, a single induction load is capable of working at two different frequencies with a single generator, so that the configuration can be simplified. Further, since it is not necessary to employ a plurality of generators corresponding to different frequencies, there will be no mutual interference between the generators, so that the apparatus can be easily designed, the configuration can be simplified, the manufacture can be facilitated, and the manufacturing cost can be easily reduced.

In the electric power supply apparatus according to the first aspect of the present invention, it is preferred that the matching circuit includes a transformer which converts a plurality of load resonance impedances to substantially equal oscillator output impedance.

With such a configuration, the matching circuit is provided with a transformer which converts the load resonance impedances of a plurality of resonance circuits to substantially the same oscillator output impedance. Thus, the maximum electric power is supplied to the induction load at different frequencies, and the induction load is enabled to work efficiently.

In the electric power supply apparatus according to the first aspect of the present invention, it is preferred that the transformer includes a primary winding connected to the generator so as to be supplied with the AC electric power, and a secondary winding having a tap which converts a plurality of different load resonance impedances to substantially equal oscillator output impedance.

With such a configuration, the primary winding of the transformer is connected to the generator so as to be supplied with the AC electric power, and the secondary winding of the transformer is provided with a tap which converts load resonance impedances to substantially the same oscillator output impedance. Thus, the maximum electric power is supplied to the induction load at different frequencies, so that the induction load is enabled to work efficiently.

In the electric power supply apparatus according to the first aspect of the present invention, it is preferred that the transformer includes a plurality of the transformers, the plurality of the transformers being provided for each of the resonance circuits which converts the load resonance impedance to the oscillator output impedance.

With such a configuration, a plurality of the transformers, each having the oscillator output impedance substantially equal to the respective load resonance impedances of the matching circuit, are provided. Thus, frequency current with frequency other than the resonance frequency does not flow into the respective transformers, therefore the configuration of the transformers can be simplified, and the cost can be reduced.

In the electric power supply apparatus according to the first aspect of the present invention, it is preferred that the control circuit is provided with a frequency electric power ratio controller which switches the frequency of the AC electric power output from the generator according to a condition in which the induction load works.

With such a configuration, the frequency of the AC electric power output from the generator is switched by the frequency electric power ratio controller of the control circuit according to the condition in which the induction load works. Thus, frequency synchronizing can be easily performed according to the load, resonance at different frequencies can be efficiently achieved, and induction load is enabled to work efficiently.

In the electric power supply apparatus according to the first aspect of the present invention, it is preferred that the frequency electric power ratio controller sets the frequency of the AC electric power output from the generator based on a set input signal concerning the condition in which the induction load works, the condition being set by an input operation from an input section.

With such a configuration, after a condition in which the induction load works is set by input operation from an input section, the frequency electric power ratio controller sets the frequency of the AC electric power output from the generator based on a set input signal concerning the set condition. Thus, it is possible to appropriately set the frequency of the AC electric power to be output according to the load, therefore the versatility can be expanded.

In the electric power supply apparatus according to the first aspect of the present invention, it is preferred that the control circuit includes a low-frequency synchronizing circuit which controls the oscillation frequency of the generator so that an output frequency of the low-frequency electric power output from the generator becomes a predetermined series resonance frequency which is characteristic of impedance, a high-frequency synchronizing circuit which controls the oscillation frequency of the generator so that an output frequency of the high-frequency electric power output from the generator becomes a predetermined series resonance frequency which is characteristic of impedance, and the frequency electric power ratio controller which switches between the low-frequency and the high-frequency.

With such a configuration, the frequency electric power ratio controller switches between the low-frequency and the high-frequency, and the low-frequency synchronizing circuit and the high-frequency synchronizing circuit respectively control the oscillation frequency of the generator so that the output frequency output from the generator becomes the predetermined series resonance frequency which is characteristic of impedance. Thus, the switching between different frequencies can be easily performed by the frequency electric power ratio controller, and frequency synchronizing at different frequencies can be easily performed by the low-frequency synchronizing circuit and the high-frequency synchronizing circuit.

In the electric power supply apparatus according to the first aspect of the present invention, it is preferred that the control circuit is provided with a frequency electric power ratio controller which controls to switch the frequency of the AC electric power output from the generator in unit of cycle.

With such a configuration, the frequency electric power ratio controller controls to switch the frequency of the AC electric power output from the generator in unit of cycle. Thus, since the frequency of the AC electric power output from the generator is switched within one cycle so as to enable the induction load to suitably work, the induction load can favorably work due to the high speed switching.

In the electric power supply apparatus according to the first aspect of the present invention, it is preferred that the frequency electric power ratio controller is capable of changing a time ratio at which the respective frequencies are alternately output, based on the set input signal concerning the condition in which the induction load works, the condition being set by an input operation from an input section.

With such a configuration, after a condition in which the induction load works is set by input operation from an input section, the frequency electric power ratio controller changes the time ratio at which the respective frequencies are alternately output, based on a set input signal concerning the set condition. Thus, the condition in which the induction load works can be changed, and the versatility can be expanded.

In the electric power supply apparatus according to the first aspect of the present invention, it is preferred that the control circuit controls the frequency of the AC electric power output from the generator based on a frequency current flowing in the resonance circuit.

With such a configuration, the control circuit controls the frequency of the AC electric power output from the generator based on a frequency current flowing in the resonance circuit. Thus, efficient series resonance at different frequencies can be easily achieved.

In the electric power supply apparatus according to the first aspect of the present invention, it is preferred that the control circuit includes synchronous control circuits corresponding to each of the frequencies of the AC electric power supplied from the generator, and a storage for, when transiting to a quiescent period during which the AC electric power is not supplied from the generator with respect to a predetermined frequency, storing frequency information concerning the predetermined frequency. When transiting to an operation period during which the AC electric power is supplied from the generator with respect to the predetermined frequency, the respective synchronous control circuit performs the synchronous control based the frequency information as synchronizing information stored in the storage.

With such a configuration, when transiting to a quiescent period during which the AC electric power is not supplied from the generator with respect to a predetermined frequency, the storage stores the synchronizing information concerning the predetermined frequency, while when transiting to an operation period during which the AC electric power is supplied from the generator with respect to the predetermined frequency, the respective synchronous control circuits perform the synchronous control based on the synchronizing information stored in the storage. Thus, the high speed switching between the different frequencies can be achieved, and the induction load is enabled to work favorably corresponding to the different frequencies.

In the electric power supply apparatus according to the first aspect of the present invention, it is preferred that the control circuit is provided with an output control circuit which changes the output of the AC electric power output from the generator.

With such a configuration, the output of the AC electric power output from the generator is appropriately changed by the output control circuit of the control circuit. Thus, when, for example, induction heating a workpiece-to-be-heated with an induction heating coil as an induction load at different frequencies, the heating condition can be set according to the shape of the workpiece-to-be-heated, and the condition in which the induction load works can be changed, so that the versatility can be improved.

In the electric power supply apparatus according to the first aspect of the present invention, it is preferred that the generator includes a converter circuit which converts the AC electric power to a predetermined DC electric power, and an inverse conversion circuit which converts the DC electric power converted by the converter circuit to a predetermined AC electric power, in which the output control circuit feedback-controls an output value of the DC current output from the converter circuit.

With such a configuration, the output of the AC electric power output from the generator is changed under control of the output control circuit through feedback-controlling the output of the DC electric power output from the converter circuit of the generator, which converts the AC electric power to the predetermined DC electric power that is to be converted to the predetermined AC electric power by the inverse conversion circuit. Thus, the output of the AC electric power can be easily changed with simple configuration.

In the electric power supply apparatus according to the first aspect of the present invention, it is preferred that the generator is provided with an inverse conversion circuit which converts the DC electric power to a voltage square wave AC electric power.

In such a configuration, the inverse conversion circuit of the generator is a voltage type which converts the DC electric power to a voltage square wave AC electric power. Thus, the high speed switching between the AC electric powers with different frequencies can be achieved, and the induction load is enabled to work efficiently.

The induction heating apparatus according to a second aspect of the present invention includes an electric power supply apparatus according to the first aspect of the present invention, and an induction heating coil which induction-heats a workpiece-to-be-heated with the electric power having different frequencies supplied from the electric power supply apparatus.

With such a configuration, the induction heating coil induction-heats a workpiece-to-be-heated with the electric power having different frequencies supplied from the electric power supply apparatus according to the first aspect of the present invention. Thus, configuration for performing induction heating can be simplified, manufacture can be facilitated, and manufacturing cost can be easily reduced.

Effect of the Invention

With such a configuration, since AC electric power with different frequencies is output from the generator so that a plurality of resonance circuits resonate at respective predetermined resonance frequencies, a single induction load is enabled to work at two different frequencies with a single generator, the configuration can be simplified, no mutual interference will be generated between the generators, the apparatus can be easily designed, the configuration can be simplified, the manufacture can be facilitated, and the manufacturing cost can be reduced.

EXPLANATION OF CODES

Figure 1:
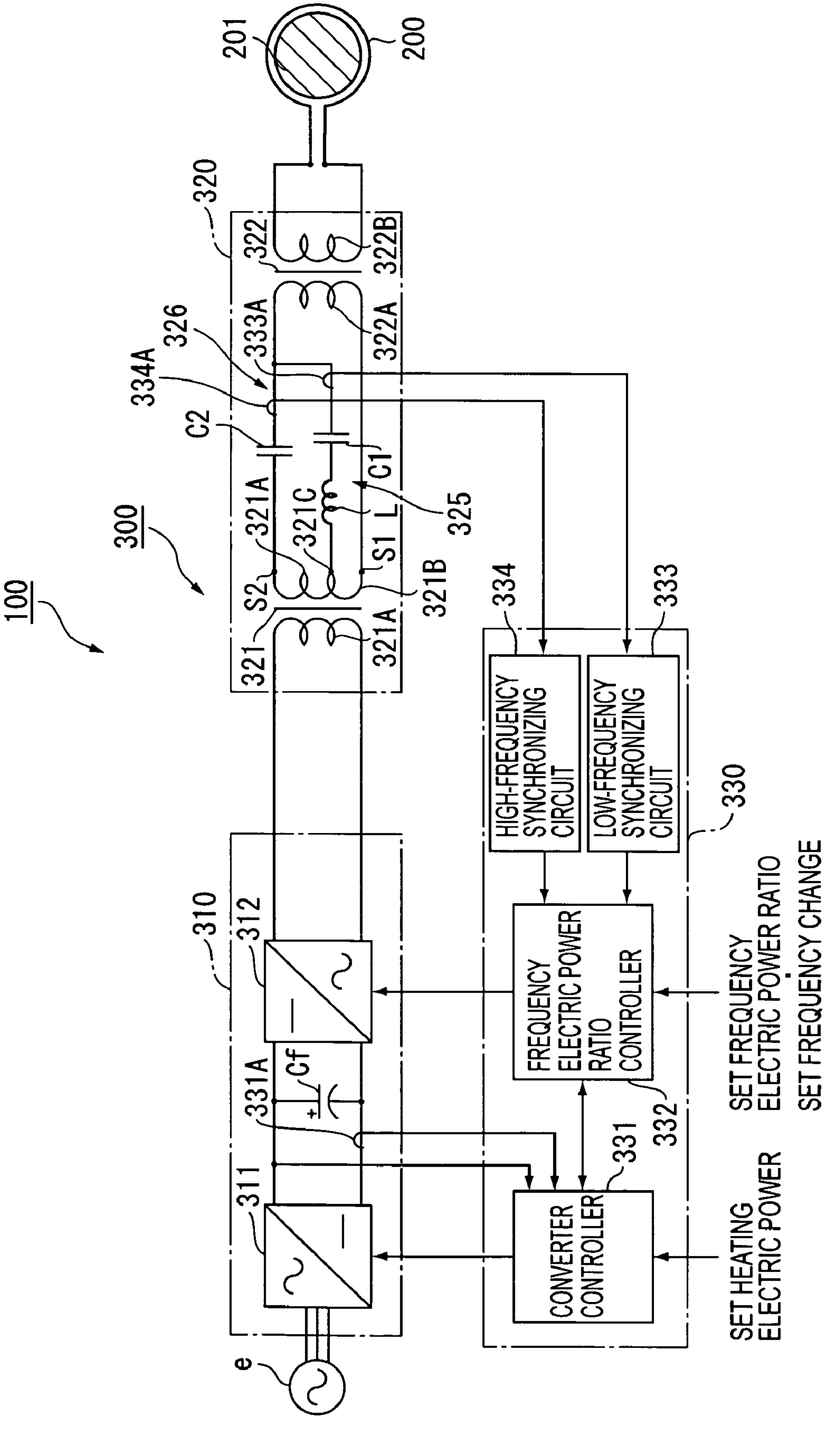
FIG. 1 is a circuit diagram showing a brief configuration of an induction heating apparatus in a first embodiment of the present invention.

100, 400, 600 induction heating apparatus
200 induction heating coil (as an induction load)
201 workpiece-to-be-heated
300, 500, 700 electric power supply apparatus
310 generator
311 converter (as a converter circuit)
312 inverter (as an inverse conversion circuit)
320, 520, 720 matching circuit
321 matching transformer (as a transformer)
321A, 521A primary winding
321B, 521B secondary winding
321C tap
330 control circuit
331 converter controller (as an output control circuit)
332 frequency electric power ratio controller
521 low-frequency matching transformer (as a transformer)
522 high-frequency matching transformer (as a transformer)

BEST MODE FOR CARRYING OUT THE INVENTION

Preferred embodiments of the present invention will be described below with reference to attached drawings. Although the embodiments of the present are described by exemplifying induction heating apparatuses for heat-treating workpieces-to-be-heated with complex shape such as gears, bolts, and nuts which have recess and projection on the surface thereof, or workpieces-to-be-heated such as components made of composite materials, the workpieces-to-be-heated are not limited thereto but can be others. Further, the present invention can be applied to configurations which supply electric power to any other loads, instead of being limited to induction heating. Further, although the present invention is explained with configurations in which the electric power is supplied at two different frequencies of a low-frequency and a high-frequency, the present invention is not limited thereto, but the electric power can be supplied at plural frequencies more than two.

FIRST EMBODIMENT

Figure 2:
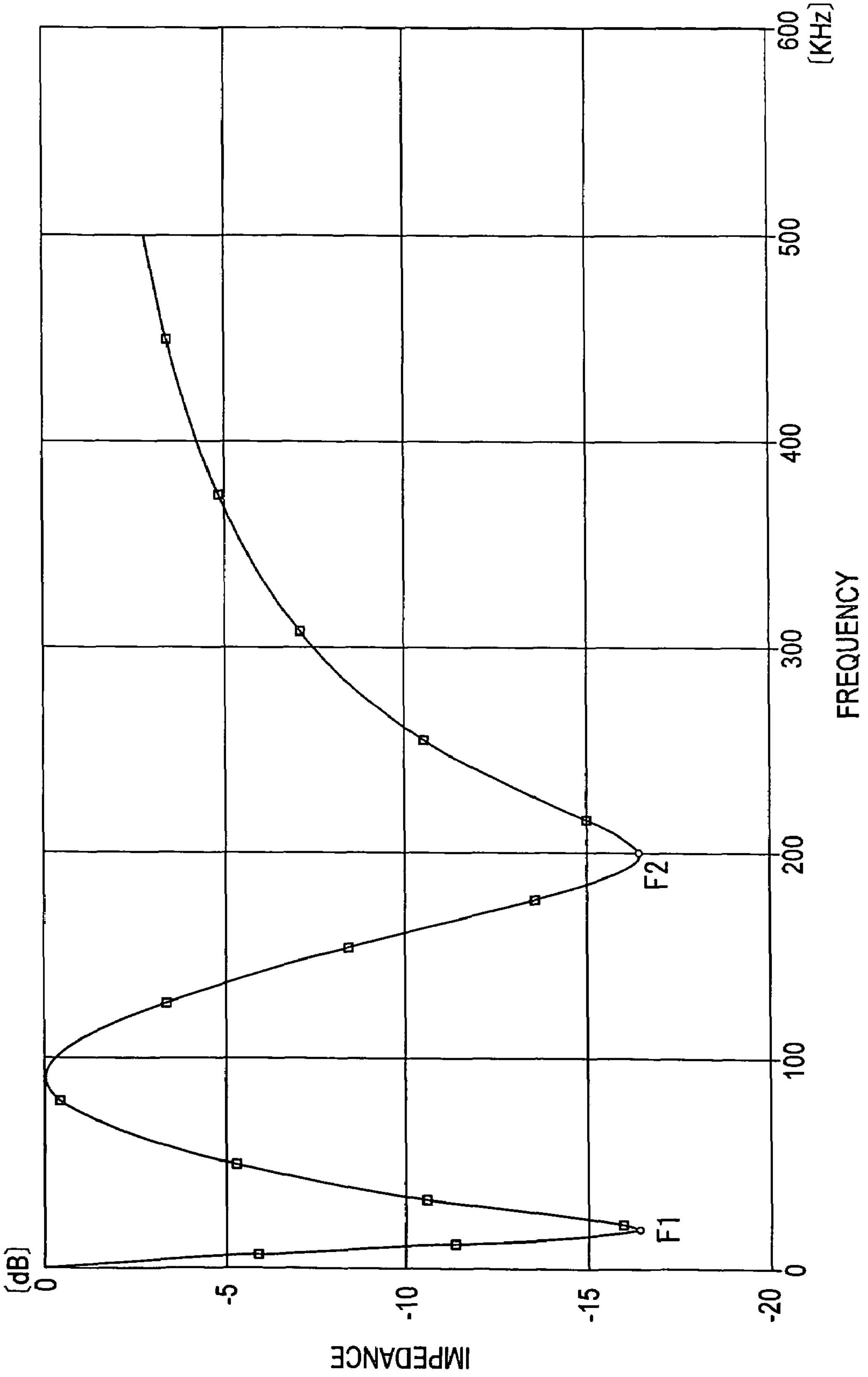
FIG. 2 is a graph showing a frequency characteristic of impedance of a matching circuit in the first embodiment.

FIG. 1 is a circuit diagram showing a brief configuration of an induction heating apparatus in a first embodiment of the present invention. FIG. 2 is a graph showing a frequency characteristic of impedance of a matching circuit.

(Configuration of Induction Heating Apparatus)

As shown in FIG. 1, an induction heating apparatus 100 includes an induction heating coil 200 which induction heats a workpiece-to-be-heated 201 and an electric power supply apparatus 300 which supplies electric power with different frequencies to the induction heating coil 200 to perform induction heating.

The induction heating coil 200 is connected to the electric power supply apparatus 300. Equivalent inductance L0 of the induction heating coil 200 may be, for example, several tens to several hundreds nH. The induction heating coil 200 induction heats the workpiece-to-be-heated 201 with the AC electric power with different frequencies supplied from the electric power supply apparatus 300. The electric power supply apparatus 300 includes a generator 310, a matching circuit 320, and a control circuit 330.

The generator 310 alternately outputs, in a form of voltage, AC electric powers with predetermined different frequencies (namely the low-frequency and the high-frequency) converted from the commercial AC power source e at high speed, according to a predetermined duty ratio. The generator 310 includes a converter 311 as a converter circuit, an inverter 312 as a voltage type inverse conversion circuit, and a smoothing capacitor Cf. The converter 311 may be, for example, a converter circuit using one of various bridge rectifying circuits. The converter 311 is connected to the commercial AC power source e to convert the commercial AC power source e into DC electric power. The converted DC electric power is appropriately smoothed via the smoothing capacitor Cf and output to the inverter 312. The inverter 312 converts the DC electric power output from the converter 311 into a single-phase AC electric power having voltage square wave of a predetermined frequency, for example, the frequency between 10 kHz and 300 kHz. Specifically, the inverter 312 is provided with a transistor as a switching element (not shown) and outputs the AC electric power by ON/OFF control of the switching element.

The matching circuit 320 has two different series resonance frequencies respectively corresponding to the low-frequency and the high-frequency. The matching circuit 320, together with the induction heating coil 200, performs series resonance to induction heat the workpiece-to-be-heated 201 with the high-frequency or the low-frequency electric power output from the generator 310. The matching circuit 320 includes a matching transformer 321, a reactor L, a first capacitor C1, a second capacitor C2, and a current transformer 322.

A secondary winding 322B of the current transformer 322 is connected with the induction heating coil 200. Assuming that the turn ratio of the secondary winding 322B is N and the equivalent inductance of the induction heating coil 200 is L0, a load coil equivalent inductance of $N^2$L0 will be generated to the primary winding side of the current transformer 322, the secondary winding side of which is connected with the induction heating coil 200. Further, a capacitor of tens of μF, for example, is used for the first capacitor C1, and the impedance of the first capacitor C1 is set to, for example, 10 to 20 times as large as that of the second capacitor C2, which is a capacitor of, for example, several μF. Furthermore, a reactor of several μH, for example, is used for the reactor L, and the inductance of the reactor L is set to, for example, 4 to 5 times as large as the load coil equivalent inductance $N^2$L0.

The matching transformer 321 matches load impedances of two resonance frequencies (the high-frequency and the low-frequency), which are load resonance impedances, with an output impedance of the AC electric power output from the generator 310, which is an oscillator output impedance The primary winding 321A of the matching transformer 321 is connected to the generator 310, so that the converted AC electric power is input to the primary winding 321A. The secondary winding 321B of the matching transformer 321 is provided with a tap 321C, which is positioned at a point of the secondary winding 321B corresponding to the two resonance frequencies of the high-frequency and the low-frequency. In other words, the matching transformer 321 has an output equivalent impedance between a pair of output terminals S1 and S2, which are respectively connected with lead wires (not shown) of the secondary winding 321B, and an output equivalent impedance between the tap 321C and the output terminal S1.

A series circuit of the second capacitor C2 and the primary winding 322A of the current transformer 322 is connected between the pair of output terminals S1 and S2, which are respectively connected with the lead wires (not shown) of the secondary winding 321B of the matching transformer 321. In other words, the second capacitor C2, which has relatively small impedance, is connected between two ends of the secondary winding 321B, the output equivalent impedance therebetween being relatively large, of the matching transformer 321. A series circuit of the reactor L and the first capacitor C1 is arranged between the tap 321C of the matching transformer 321 and a connection point of the first capacitor C1 and the primary winding 322A of the current transformer 322. In other words, the series circuit of the first capacitor C1 and the reactor L, which has relatively large impedance, is arranged between the output terminal S1 and the tap 321C, the output equivalent impedance therebetween being relatively small, of the secondary winding 321B of the matching transformer 321.

Thus, in the matching circuit 320, a low-frequency series resonance circuit 325, which includes the reactor L, the first capacitor C1, and the load coil equivalent inductance $N^2$L0, for performing series resonance at the low-frequency, and a high-frequency series resonance circuit 326, which includes the second capacitor C2 and the load coil equivalent inductance $N^2$L0, for performing series resonance at the high-frequency are constituted. Since having low load resonance impedance, the low-frequency series resonance circuit 325 is connected between the output terminal S1 and the tap 321C of the secondary winding 321B, the impedance conversion ratio therebetween being relatively large. Since having high load resonance impedance, the high-frequency series resonance circuit 326 is connected between two output terminals S1 and S2 of the secondary winding 321B, the impedance conversion ratio therebetween being relatively small.

Thus, by having the low-frequency series resonance circuit 325 and the high-frequency series resonance circuit 326, the matching circuit 320 has different resonance impedances corresponding to two different resonance frequencies of the low-frequency and the high-frequency. These resonance impedances match the output equivalent impedance of the matching transformer 321. In other words, the low-frequency series resonance circuit 325 having small resonance impedance is arranged between the tap 321C and the output terminal S1, the output equivalent impedance therebetween being relatively small, of the matching transformer 321, and the high-frequency series resonance circuit 326 having large resonance impedance is arranged between the output terminals S1 and S2, the output equivalent impedance therebetween being relatively large.

Further, since the maximum electric power is supplied to the load when the output impedance of the supplied electric power matches the load impedance, based on the frequency characteristic of impedance of the matching circuit 320 as shown in the graph in FIG. 2, the matching circuit 320 matches, by the matching transformer 321, the output impedance with the resonance impedances of the low-frequency series resonance circuit 325 and the high-frequency series resonance circuit 326 to supply the maximum electric power efficiently. Further, since the circuit impedance of the matching circuit 320 becomes pure resistance of the AC electric power at resonance points of the low-frequency series resonance circuit 325 and the high-frequency series resonance circuit 326, and is proportional to the square root of the frequency, the resonance impedance of the high-frequency series resonance circuit 326 is larger than the resonance impedance of the low-frequency series resonance circuit 325 by a value proportional to the square root of {(frequency of the high-frequency)/(frequency of the low-frequency)}.

The control circuit 330 synchronizes the low-frequency and the high-frequency at which the matching circuit 320 performs series resonance, and controls the generator 310 to alternately output low-frequency power and high-frequency power according to a predetermined time ratio. The control circuit 330 is connected to an input section (not shown). The input section outputs predetermined signals corresponding to input operations conducted by an operator, the input operations corresponding to various settings such as heating power, power ratio etc. The control circuit 330 controls the generator 310 to control the heating power and power ratio based on the set input signal from the input section. The control circuit 330 includes a converter controller 331, a frequency electric power ratio controller 332, a low-frequency synchronizing circuit 333, and a high-frequency synchronizing circuit 334.

The converter controller 331 is connected to the converter 311 of the generator 310. The converter controller 331 recognizes an output value of the DC electric power output from the converter 311, controls, based on the set input signal output from the input section concerning the heating power, the converter 311 so that the output value becomes a predetermined output value. Specifically, the converter controller 331 detects a voltage value of the output side of the converter 311, detects a current value with a current detector 331A (such as a DC current sensor) arranged on the output side of the converter 311, and controls, based on the set input signal from the input section, the output value of the DC electric power through feedback-controlling the DC voltage and current with a thyristor etc.

The frequency electric power ratio controller 332 is connected to the inverter 312 of the generator 310. Based on the setting signal concerning the power ratio corresponding to the input operation conducted from the input section, the frequency electric power ratio controller 332 controls the switching between the low-frequency AC electric power and high-frequency AC electric power output from the inverter 312 at high speed (such as 1 ms, for example) according to the predetermined power ratio (i.e. duty ratio). Specifically, based on the set input signal from the input section, the frequency electric power ratio controller 332 sets respective output periods of the low-frequency AC electric power and the high-frequency AC electric power within one cycle (100 ms, for example) for outputting both the low-frequency and the high-frequency, so as to control the switching between the low-frequency and the high-frequency as well as the power ratio.

The frequency electric power ratio controller 332 outputs a signal concerning timing for switching between the low-frequency electric power and the high-frequency (for example, a signal concerning the duty ratio) to the converter controller 331. The converter controller 331, which have acquired the signal concerning timing, controls the converter 311 so that the output value of the DC electric power output from the converter 311 becomes the predetermined output values respectively at the timing of the low-frequency and the high-frequency.

The low-frequency synchronizing circuit 333 is connected to the matching circuit 320, as well as connected to the frequency electric power ratio controller 332. The low-frequency synchronizing circuit 333 detects a frequency current of the low-frequency series resonance circuit 325 of the matching circuit 320 with a low-frequency current detector 333A such as a low-frequency current sensor, and outputs a predetermined control signal to the frequency electric power ratio controller 332. The control signal is a signal for allowing the frequency electric power ratio controller 332 to control the oscillation frequency of the inverter 312 so that the output frequency of the low-frequency electric power output from the generator 310 becomes the series resonance frequency indicated as F1 in the graph of frequency characteristic of impedance in FIG. 2. When transiting to a quiescent period during which the frequency current can not be detected and the output of the control signal is stopped, the low-frequency synchronizing circuit 333 stores the frequency information, which is a synchronizing information concerning the detected frequency current, in a storage such as a separate memory, and when transiting to an operation period during which the frequency current is detected and the output of the control signal is performed again, the low-frequency synchronizing circuit 333 controls to read the frequency information stored in the storage and output the control signal for performing frequency synchronizing.

The high-frequency synchronizing circuit 334 is connected to the matching circuit 320, as well as connected to the frequency electric power ratio controller 332. The high-frequency synchronizing circuit 334 detects a frequency current of the high-frequency series resonance circuit 326 of the matching circuit 320 with a high-frequency current detector 334A such as a high-frequency current sensor, and outputs a predetermined control signal to the frequency electric power ratio controller 332. Similar to the low-frequency synchronizing circuit 333, the control signal is a signal for allowing the frequency electric power ratio controller 332 to control the oscillation frequency of the inverter 312 so that the output frequency of the high-frequency electric power output from the generator 310 becomes the series resonance frequency indicated as F2 in the graph of frequency characteristic of impedance in FIG. 2. Similar to the low-frequency synchronizing circuit 333, when transiting to a quiescent period during which the frequency current can not be detected and the output of the control signal is stopped, the high-frequency synchronizing circuit 334 stores the frequency information concerning the detected frequency current in the storage, and when transiting to an operation period during which the frequency current is detected and the output of the control signal is performed again, the high-frequency synchronizing circuit 334 controls to read the frequency information stored in the storage and output the control signal for performing frequency synchronizing.

The frequency electric power control circuit of the present invention is constituted by the frequency electric power ratio controller 332, the low-frequency synchronizing circuit 333, and the high-frequency synchronizing circuit 334. Incidentally, the frequency electric power ratio controller of the present invention is not limited to the above configuration.

(Operation of Induction Heating Apparatus)

The operation of the induction heating apparatus 100 of the first embodiment will be described as below.

First, the operator turns the power on and inputs the heating power and power ratio by appropriately performing input operation from the input section according to the workpiece-to-be-heated 201 to be induction heated. Among the set input signals output from the input section, a set input signal concerning the heating power is input to the converter controller 331 of the control circuit 330, and a set input signal concerning the power ratio is input to the frequency electric power ratio controller 332 of the control circuit 330.

Further, the converter 311 of the generator 310, to which the commercial AC power source e is supplied, converts the commercial AC power source e into a DC electric power with a predetermined output under the control of the converter controller 331 based on the set input signal concerning the heating power, and outputs the DC electric power. In other words, the converter controller 331 detects a DC voltage of the output side of the converter 311, detects a current value with the current detector 331A, and adjusts the electric power output from the converter 311 by feedback-controlling the DC voltage and current with a thyristor etc.

The DC electric power output from the converter 311 is appropriately smoothed by the smoothing capacitor Cf and supplied to the inverter 312. The inverter 312, to which the DC electric power is supplied, converts the DC electric power into an AC electric power of the low-frequency or an AC electric power the high-frequency under the control of the frequency electric power ratio controller 332 based on the set input signal concerning the power ratio, and alternately outputs the AC electric powers. In other words, the frequency electric power ratio controller 332 sets the output ratio of the low-frequency and the high-frequency of the AC electric power output from the inverter 312 within one cycle (100 ms, for example) for outputting both the low-frequency and the high-frequency based on the set input signal, and alternately outputs the AC electric power of the low-frequency and the AC electric power of the high-frequency at high speed while performing frequency synchronizing at predetermined output frequencies based on the control signals from the high-frequency synchronizing circuit 334 and from the low-frequency synchronizing circuit 333.

The AC electric power output from the inverter 312 is supplied to the matching circuit 320, and the matching circuit 320, together with the induction heating coil 200 which is connected to the matching circuit 320, becomes in a series resonance state at the low-frequency or the high-frequency, so that the workpiece-to-be-heated 201 is induction heated. In the series resonance of the matching circuit 320, when the AC electric power output from the inverter 312 is the low-frequency electric power, the impedance of the second capacitor C2 is far smaller than that of the first capacitor C1 (for example, the impedance of the second capacitor C2 is 1/10 to 1/20 as large as that of the first capacitor C1). Thus, the second capacitor C2, which constitutes the high-frequency series resonance circuit 326, is in open state with respect to the low-frequency, and the AC electric power of the low-frequency hardly flows into the second capacitor C2, therefore the AC electric power is supplied to the side of the first capacitor C1, which constitutes the low-frequency series resonance circuit 325. In other words, when the AC electric power of the low-frequency is supplied, the matching circuit 320 becomes in a series resonance state caused by the low-frequency series resonance circuit 325, so that the workpiece-to-be-heated 201 is induction heated.

When the AC electric power output from the inverter 312 is the high-frequency electric power, since the output equivalent impedance between the output terminals S1, which is connected with a lead wire of the secondary winding 321B, and the tap 321C is smaller than the output equivalent impedance of the secondary winding 321B of the matching transformer 321, and since the reactor L is 4 to 5 times as large as the load coil equivalent inductance $N^2L0$, the series circuit formed by the reactor L and the first capacitor C1, which constitute the low-frequency series resonance circuit, 325, is in open state with respect to the high-frequency, and the AC electric power of the high-frequency hardly flows into the series circuit formed by the reactor L and the first capacitor C1, therefore the AC electric power is supplied to the side of the second capacitor C2, which constitutes the high-frequency series resonance circuit 326. In other words, when the AC electric power of high-frequency is supplied, the matching circuit 320 becomes in a series resonance state caused by the high-frequency series resonance circuit 326, so that the workpiece-to-be-heated 201 is induction heated.

Thus, the induction heating coil 200, which induction-heats the workpiece-to-be-heated 201, can generate the AC electric power of both the low-frequency and the high-frequency via the matching circuit 320. The matching circuit 320 is connected to the generator 310 which is a voltage type generator capable of switching between the low-frequency electric power and the high-frequency electric power at high speed (such as 1 ms, for example). The matching circuit 320 has two series resonance circuits respectively corresponding to a first series resonance of the low-frequency and a second series resonance of the high-frequency. The generator 310 of the induction heating apparatus 100 is a voltage type generator capable of operating singly at either the low-frequency or the high-frequency. Also, the generator 310 is provided with a function to switch between the low-frequency and the high-frequency according to an arbitrary power ratio (duty ratio) at high speed (such as 1 ms, for example). To realize this function, the control circuit 330 is provided with the high-frequency synchronizing circuit 334 which is a frequency synchronizing (PLL) circuit for high-frequency, and the low-frequency synchronizing circuit 333 which is a frequency synchronizing (PLL) circuit for low-frequency. The two PLL circuits alternately operate according to a preset time ratio (time sharing). During operation period of the respective frequency, the PLL circuit performs frequency synchronizing. When transiting from the operation period to the quiescent period, the PLL circuit stores (retains) the immediately preceding synchronizing information; and when transiting to the operation period again, the PLL circuit recalls the stored synchronizing information and performs frequency synchronizing again. Since the interval between the operation period and the quiescent period is set to a very short period (equal to or shorter than 100 ms), during which the change of the resonance frequency of the induction load caused by the change of the temperature is very small, and time necessary for synchronization tracking is short, high speed synchronization tracking can be achieved.

(Advantages of First Embodiment)

As mentioned above, in the above embodiment, the AC electric powers having different frequencies of the low-frequency and the high-frequency are output from the generator 310 in a state where the low-frequency series resonance circuit 325 and the high-frequency series resonance circuit 326 of the matching circuit 320, together with the induction heating coil 200, perform series resonance respectively at the predetermined low-frequency and the predetermined high-frequency, under the control of the control circuit 330. Thus, since the workpiece-to-be-heated 201 can be induction heated by a single induction heating coil 200 at two different frequencies generated by a single generator 310, the configuration can be simplified, the manufacture can be facilitated, and the manufacturing cost can be reduced. Further, since only a single generator 310 is needed for supplying the AC electric power of both the low-frequency and the high-frequency, instead of a pair of generators for respectively outputting the AC electric power of the low-frequency and the AC electric power of the high-frequency, there will be no mutual interference between the pair of oscillators, therefore the apparatus can be easily designed, the configuration can be simplified, the manufacture can be facilitated, and the manufacturing cost can be easily reduced.

Further, since the matching transformer 321 having a plurality of output equivalent impedances respectively equal to the resonance impedance of the low-frequency series resonance circuit 325 and the high-frequency series resonance circuit 326 of the matching circuit 320, series resonances can be respectively caused with AC electric power from the generator 310, so as to perform induction heating. Thus, the maximum electric power can be supplied to the induction heating coil 200 which is an induction load, therefore the workpiece-to-be-heated 201 can be efficiently induction heated.

As a configuration in which the matching transformer 321 is set so as to have output equivalent impedances respectively equal to the resonance impedances, the secondary winding 321B is provided with the tap 321C under a condition that the output equivalent impedances thereof respectively substantially equal to the resonance impedances. Thus, it is easy to obtain a configuration in which the maximum electric power is supplied to the induction heating coil 200 at different frequencies to efficiently perform the induction heating. Particularly, it is easy to obtain a configuration in which the maximum electric power is supplied with a single transformer for each of different frequencies, even when the configuration includes a plurality of resonance circuits of the low-frequency series resonance circuit 325 and the high-frequency series resonance circuit 326.

The frequency of the AC electric power to be output from the inverter 312 is controlled by the frequency electric power ratio controller 332 of the control circuit 330 based on the frequency currents flowing through the low-frequency series resonance circuit 325 and the high-frequency series resonance circuit 326 so that the oscillation frequency of the low-frequency series resonance circuit 325 and the oscillation frequency of the high-frequency series resonance circuit 326 respectively becomes F1 and F2 as indicated in FIG. 2. Accordingly, frequency synchronizing becomes easy to perform, series resonance at either the low-frequency or the high-frequency can be efficiently performed, and induction heating can be efficiently performed.

Further, to control the frequency of the AC electric power to be output, the frequency currents flowing through the low-frequency series resonance circuit 325 and the high-frequency series resonance circuit 326 are respectively detected with the low-frequency current detector 333A and the high-frequency current detector 334A such as a sensor. Based on the detected frequency currents, the low-frequency synchronizing circuit 333 and the high-frequency synchronizing circuit 334 of the control circuit 330 output signal for setting the condition at which the inverter 312 is controlled by the frequency electric power ratio controller 332. Accordingly, the different induction heating states for efficiently performing induction heating respectively with the low-frequency and the high-frequency can be easily obtained with simple configuration.

The low-frequency and the high-frequency of the AC electric power to be output are controlled to switch therebetween by the frequency electric power ratio controller 332 according to the duty ratio, which is a power ratio corresponding to the condition in which the workpiece-to-be-heated 201 is induction heated by the induction heating coil 200, for example, the heating condition set by input operation in accordance with the shape of the gear. Accordingly, induction heating can be appropriately performed corresponding to the workpiece-to-be-heated 201, and the versatility can be improved. Further, since the power ratio can be changed by input operation from the input section, the condition in which the induction heating is performed can be easily changed with simple configuration, and therefore the versatility can be expanded.

The output value of the AC electric power output from the generator 310 is controlled to be changed to an output value corresponding to, for example, the heating condition set through input operation corresponding to the shape of the gear by the converter controller 331 of the control circuit 330. Accordingly, induction heating can be appropriately performed corresponding to the workpiece-to-be-heated 201, and the versatility can be expanded. Further, since the output value can be changed by input operation, the condition in which the induction heating is performed can be easily changed with simple configuration, and therefore the versatility can be easily expanded. Further, since the changing of the output of the AC electric power from the generator 310 is controlled by changing the value of the DC electric power output from the converter 311, the changing of the output of the AC electric power can be easily performed with the simple configuration.

Since the inverter 312 is a voltage type which converts the DC electric power to voltage square wave AC electric power, the configuration in which the switching between the low-frequency and the high-frequency can be easily performed at high speed (of 1 ms, for example) can be obtained. Thus, when the low-frequency and the high-frequency is switching therebetween, the period while the induction heating is stopped is an extremely short time of 1 ms, during which the change of frequency of the induction load, namely the resonance frequency of the induction load caused by the decreasing of the temperature is substantially zero. In other words, since the impedance matches the resonance frequency, there is almost no change in the resonance frequency of the induction load. Accordingly, not only good induction heating can be achieved, but also the time necessary for synchronization tracking is short, so that efficient induction heating can be achieved.

The matching circuit 320 includes resonance circuit enabled to resonate at different frequencies of the low-frequency and the high-frequency, the resonance circuit being constituted by the low-frequency series resonance circuit 325 and the high-frequency series resonance circuit 326, in which the inductance of the reactor L is larger than that of the load coil equivalent inductance $N^2L0$, and the impedance of the first capacitor C1 is set far larger than that of the second capacitor C2. Accordingly, a resonance circuit enabled to resonate at different frequencies of the low-frequency and the high-frequency even with a single generator 310 can be obtained with simple configuration.

SECOND EMBODIMENT (Configuration of Induction Heating Apparatus)

Figure 3:
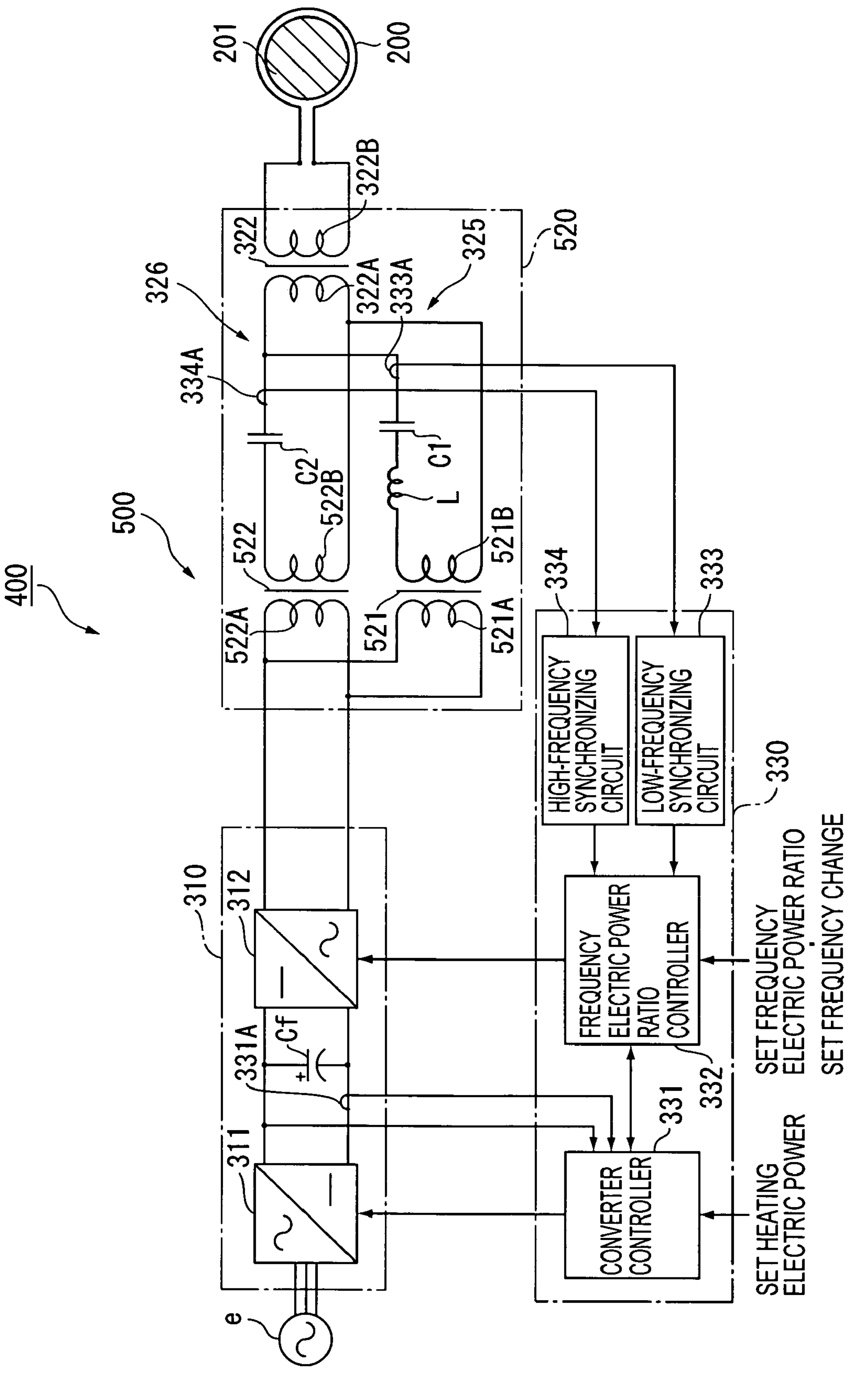
FIG. 3 is a circuit diagram showing a brief configuration of an induction heating apparatus in a second embodiment of the present invention.

The brief configuration of an induction heating apparatus according to a second embodiment of the present invention will be described with reference to attached drawings. FIG. 3 is a circuit diagram showing a brief configuration of an induction heating apparatus in the second embodiment.

As shown in FIG. 3, an induction heating apparatus 400 includes an induction heating coil 200 which is identical to that in the induction heating apparatus 100 of the first embodiment as shown in FIGS. 1 and 2, and an electric power supply apparatus 500 which supplies electric power having predetermined different frequencies to the induction heating coil 200 to perform induction heating. The electric power supply apparatus 500 includes a generator 310 and a control circuit 330, both being the same as those in the induction heating apparatus 100 of the first embodiment, and a matching circuit 520. Incidentally, in the second embodiment, like components are denoted by like numerals as of the induction heating apparatus 100 of the first embodiment and the explanation thereof will be omitted.

The matching circuit 520 has two different series resonance frequencies respectively corresponding to the low-frequency and the high-frequency. The matching circuit 520, together with the induction heating coil 200, performs series resonance with the electric power with the high-frequency or the low-frequency output from the generator 310, so that the workpiece-to-be-heated 201 is induction heated. The matching circuit 520 includes a low-frequency matching transformer 521, a high-frequency matching transformer 522, a reactor L, a first capacitor C1, a second capacitor C2, and a current transformer 322.

The low-frequency matching transformer 521 matches the impedances of the resonance frequency load of the low-frequency with the output impedance of the AC electric power output from the generator 310. The primary winding 521A of the low-frequency matching transformer 521 is connected to the generator 310, so that the converted AC electric power is input thereto.

A reactor L, a first capacitor C1, and a primary winding 322A of the current transformer 322 are connected in series to the secondary winding 521B of the low-frequency matching transformer 521. A low-frequency series resonance circuit 325 for performing series resonance at low-frequency is constituted by a reactor L, a first capacitor C1, and a load coil equivalent inductance $N^2L0$. The output equivalent impedance of the secondary winding 521B of the low-frequency matching transformer 521 is set so as to be matched with the resonance impedance of the low-frequency series resonance circuit 325.

The high-frequency matching transformer 522 matches the impedances of resonance frequency load of high-frequency with the output impedance of the AC electric power output from the generator 310. The primary winding 522A of the high-frequency matching transformer 522 and the primary winding 521A of the low-frequency matching transformer 521 are connected in parallel with the generator 310, so that the converted AC electric power is input.

A second capacitor C2 and a primary winding 322A of the current transformer 322 are connected in series to the secondary winding 522B of the high-frequency matching transformer 522. A high-frequency series resonance circuit 326 for performing series resonance at high-frequency is constituted by a second capacitor C2 and a load coil equivalent inductance $N^2L0$. The output equivalent impedance of the secondary winding 522B of the high-frequency matching transformer 522 is set so as to be matched with the resonance impedance of the high-frequency series resonance circuit 326.

(Operation of Induction Heating Apparatus)

The operation of the induction heating apparatus 400 of the second embodiment will be described as below.

When the AC electric power of the low-frequency, which is converted and output in the same manner as the first embodiment, is supplied to the matching circuit 520, since the impedance of the second capacitor C2 is far smaller than that of the first capacitor C1, the second capacitor C2 constituting the high-frequency series resonance circuit 326 is in open state with respect to the low-frequency. Accordingly, the low-frequency current flows through the low-frequency matching transformer 521, instead of the high-frequency matching transformer 522, to supply the low-frequency AC electric power to the low-frequency series resonance circuit 325. Owing to the supplied low-frequency AC electric power, the low-frequency series resonance circuit 325 is brought into a series resonance state, so that the workpiece-to-be-heated 201 is induction heated.

While when the AC electric power of the high-frequency from the generator 310 is supplied to the matching circuit 520, since the output equivalent impedance of the low-frequency matching transformer 521 is smaller than that of the high-frequency matching transformer 522, and since the reactor L is 4 to 5 times as large as the load coil equivalent inductance $N^2L0$, the series circuit, which constitutes the low-frequency series resonance circuit 325, formed by the reactor L and the first capacitor C1 is in open state with respect to the high-frequency. Accordingly, the high-frequency current flows through the high-frequency matching transformer 522, instead of the low-frequency matching transformer 521, to supply the high-frequency AC electric power to the high-frequency series resonance circuit 326. Owing to the supplied high-frequency AC electric power, the high-frequency series resonance circuit 326 is brought into a series resonance state, so that the workpiece-to-be-heated 201 is induction heated.

(Advantages of Second Embodiment)

As mentioned above, instead of the matching transformer 321 of the matching circuit 320 of the induction heating apparatus 100 of the first embodiment, there are provided the low-frequency matching transformer 521 and the high-frequency matching transformer 522 having the output equivalent impedances respectively corresponding to the resonance impedance of the low-frequency series resonance circuit 325 and the resonance impedance of the high-frequency series resonance circuit 326 Accordingly, in addition to the advantages owned by the induction heating apparatus 100 of the first embodiment, the induction heating apparatus 400 of the second embodiment has the advantage of: since the high-frequency current does not flow into the low-frequency matching transformer 521 and the low-frequency current does not flow into the high-frequency matching transformer 522, inexpensive transformers with simple structure can to be used for the matching transformers 521 and 522, therefore the apparatus cost can be reduced.

THIRD EMBODIMENT (Configuration of Induction Heating Apparatus)

Figure 4:
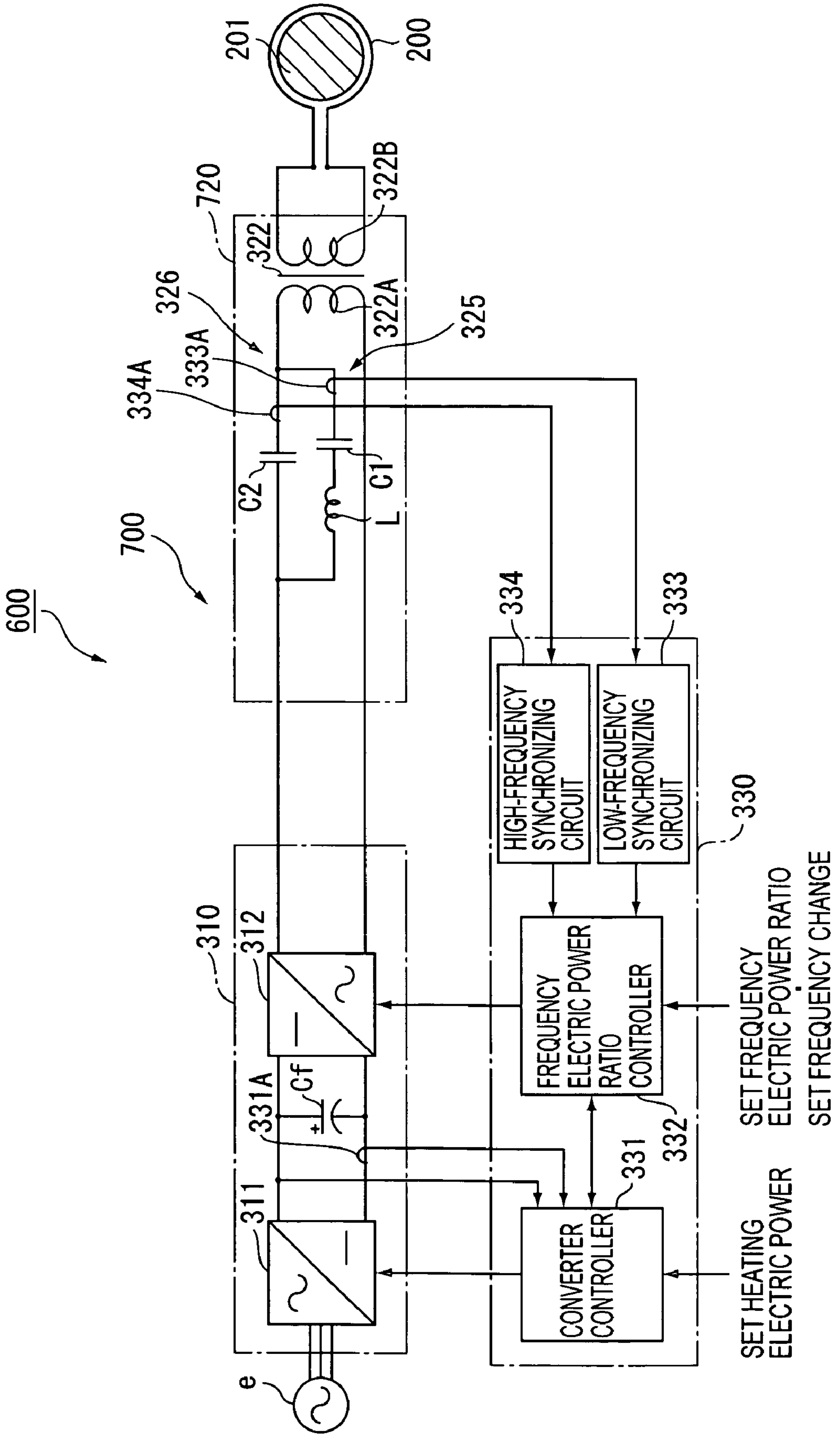
FIG. 4 is a circuit diagram showing a brief configuration of an induction heating apparatus in a third embodiment of the present invention.

The brief configuration of an induction heating apparatus according to a third embodiment of the present invention will be described with reference to attached drawings. FIG. 4 is a circuit diagram showing a brief configuration of the induction heating apparatus in the third embodiment.

As shown in FIG. 4, an induction heating apparatus 600 includes an induction heating coil 200 which is identical to that in the induction heating apparatus 100 of the first embodiment as shown in FIGS. 1 and 2, and an electric power supply apparatus 700 which supplies electric power having different frequencies to the induction heating coil 200 to perform induction heating. The electric power supply apparatus 700 includes a generator 310 and a control circuit 330, both being the same as those in the induction heating apparatus 100 of the first embodiment, and a matching circuit 720. Incidentally, in the third embodiment, like components are denoted by like numerals as of the induction heating apparatus 100 of the first embodiment and the explanation thereof will be omitted.

The matching circuit 720 has two different series resonance frequencies respectively corresponding to the low-frequency and the high-frequency. The matching circuit 720, together with the induction heating coil 200, performs series resonance with the electric power with the high-frequency or the low-frequency output from the generator 310, so that the workpiece-to-be-heated 201 is induction heated. The matching circuit 720 includes a reactor L, a first capacitor C1, a second capacitor C2, and a current transformer 322. In other words, the induction heating apparatus 600 as shown in FIG. 4 does not include a matching transformer 321 of the induction heating apparatus 100 as shown in FIG. 1.

Specifically, the reactor L, the first capacitor C1, and the primary winding 322A of the current transformer 322 are connected in series to the generator 310. Further, the second capacitor C2 is connected in parallel with the series circuit of the reactor L and the first capacitor C1. Further, in the matching circuit 720, a low-frequency series resonance circuit 325, which includes the reactor L, the first capacitor C1, and the load coil equivalent inductance $N^2L0$, for performing series resonance at low-frequency, and a high-frequency series resonance circuit 326, which includes the second capacitor C2 and the load coil equivalent inductance $N^2L0$, for performing series resonance at high-frequency are constituted.

(Operation of Induction Heating Apparatus)

The operation of the induction heating apparatus 600 of the third embodiment will be described as below.

When the AC electric power of the low-frequency, which is converted and output in the same manner as the first embodiment, is supplied to the matching circuit 720, since the impedance of the second capacitor C2 is far smaller than that of the first capacitor C1, the second capacitor C2 constituting the high-frequency series resonance circuit 326 is in open state with respect to the low-frequency. Accordingly, the low-frequency current flows into the reactor L and the first capacitor C1 of the low-frequency series resonance circuit 325 to supply the low-frequency AC electric power to the low-frequency series resonance circuit 325. Owing to the supplied low-frequency AC electric power, the low-frequency series resonance circuit 325 is brought into a series resonance state, so that the workpiece-to-be-heated 201 is induction heated.

While when the AC electric power of the high-frequency from the generator 310 is supplied to the matching circuit 720, since the reactor L is 4 to 5 times as large as the load coil equivalent inductance $N^2L0$, the series circuit, which constitutes the low-frequency series resonance circuit 325, formed by the reactor L and the first capacitor C1 is in open state with respect to the high-frequency. Accordingly, the high-frequency current flows into the second capacitor C2 of the high-frequency series resonance circuit 326 to supply the high-frequency AC electric power to the high-frequency series resonance circuit 326. Owing to the supplied high-frequency AC electric power, the high-frequency series resonance circuit 326 is brought into a series resonance state, so that the workpiece-to-be-heated 201 is induction heated.

(Advantages of Third Embodiment)

As mentioned above, the low-frequency series resonance circuit 325 and the high-frequency series resonance circuit 326 are constituted without providing a matching transformer 321 of the matching circuit 320 of the induction heating apparatus 100 of the first embodiment. Accordingly, the configuration can be simplified, the manufacture can be facilitated, and the manufacturing cost can be easily reduced.

Further, the low-frequency series resonance circuit 325 and the high-frequency series resonance circuit 326 are constituted by connecting the second capacitor C2 in parallel with the series circuit of the reactor L and the first capacitor C1, the series circuit being part of the series circuit of the reactor L, the first capacitor C1, and the primary winding 322A of the current transformer 322. Accordingly, it is easy to obtain a configuration in which the induction heating is performed with a single generator 310 and a single induction heating coil 200 at two different frequencies of the low-frequency and the high-frequency.

Due to the simple configuration compared to the first and second embodiments, the present embodiment has merit particularly when being used in the state where the electric power of the two frequencies for heating the workpiece-to-be-heated do not reach the maximum value at the same time.

OTHER EMBODIMENTS

It is to be understood that the present invention is not limited to the embodiments described above, and various modifications and variations in design can be made without departing from the spirit and scope of the present invention.

For example, any the workpiece-to-be-heated 201 can be induction heated, instead of being limited to the workpiece-to-be-heated having complex shape with recessed and projecting on the surface thereof such as gears, or workpiece-to-be-heated such as components made of composite materials. Further, the induction load can be any others such as an induction motor, instead of being limited to the induction heating coil 200.

Further, the AC electric power to be supplied may be supplied at any frequency band. Further, the configuration for supplying the AC electric power is not limited to the configuration constituted by the converter 311, the inverter 312, and the smoothing capacitor Cf.

Further, the inverter 312 is not limited to a voltage type inverter which converts the electric power to voltage square wave electric power.

Figure 5:
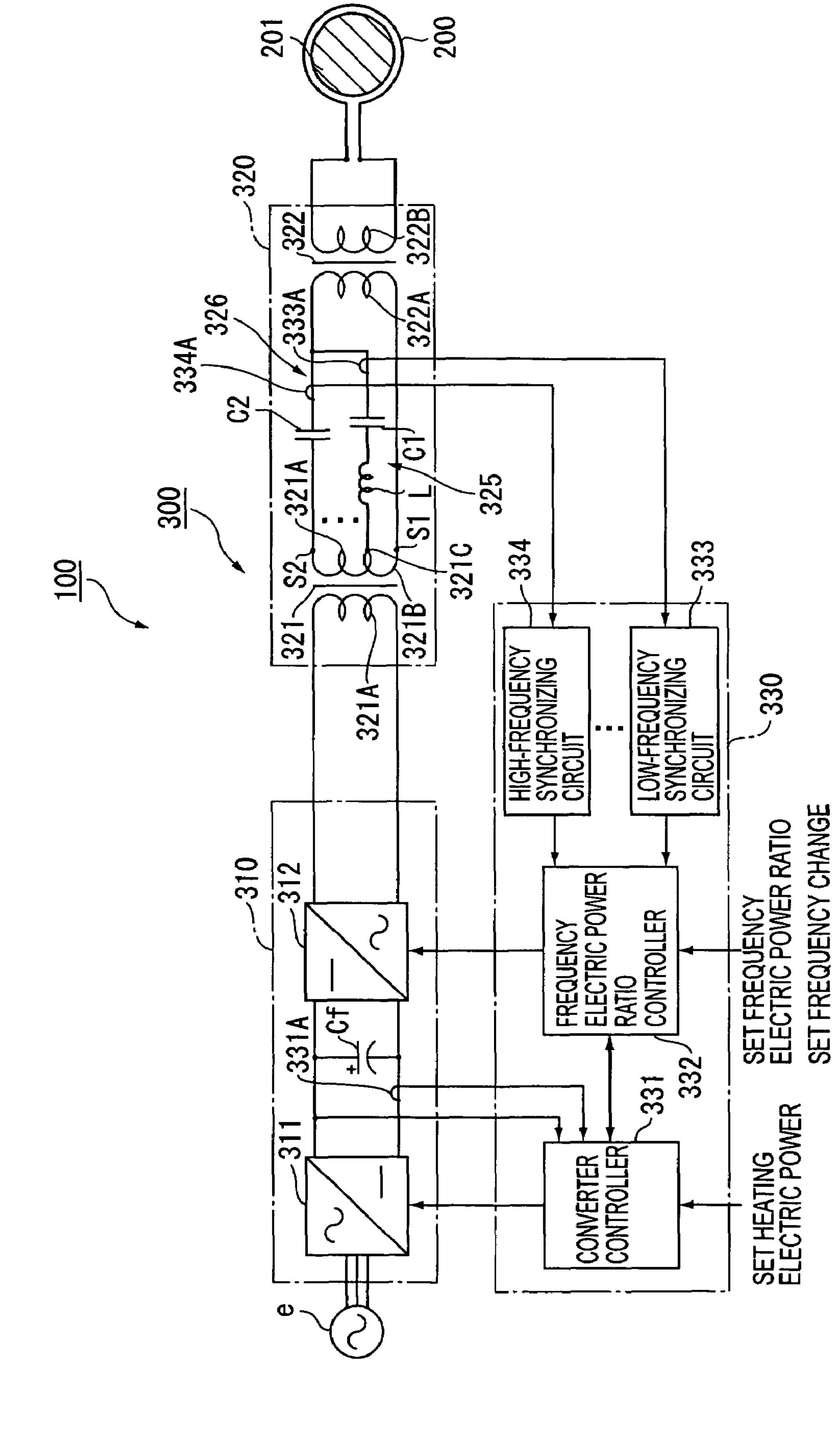
FIG. 5 is a circuit diagram showing a brief configuration of an induction heating apparatus in still another embodiment of the present invention.
Figure 6:
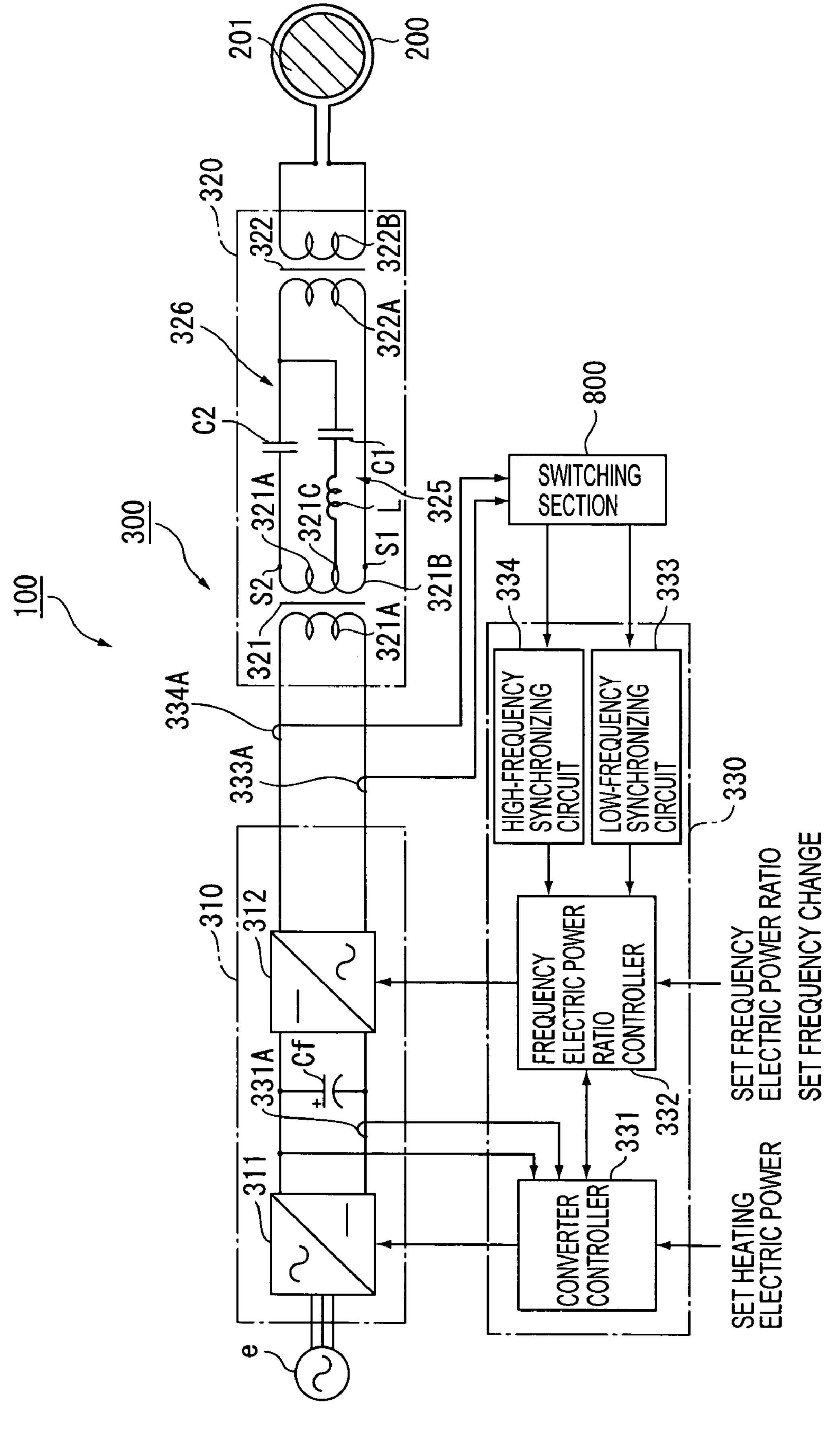
FIG. 6 is a circuit diagram showing a brief configuration of an induction heating apparatus in still another embodiment of the present invention.

Further, the configuration is not limited to the one in which the electric power is supplied at two frequencies of the low-frequency and the high-frequency, but can be the one in which the electric power is supplied at three or more different frequencies. Specifically, as shown in FIG. 5, the configuration is constituted by providing a plurality of taps to the secondary winding 321B of the matching transformer 321 to form a plurality of series resonance circuits in parallel, providing current detectors to respective series resonance circuits, and providing a plurality of synchronous circuits corresponding to respective series resonance circuits. As shown in FIG. 5, since a plurality of series resonance circuits are provided corresponding to the condition in which the induction load works, the AC electric power corresponding to respective resonance frequencies can be supplied to make the induction load work, and therefore the versatility can be expanded In the first embodiment as shown in FIGS. 1 and 2, the frequency current of the low-frequency series resonance circuit 325 of the matching circuit 320 and the frequency current of the high-frequency series resonance circuit 326 of the matching circuit 320 are respectively detected by the low-frequency current detector 333A (such as a low-frequency current sensor) and the high-frequency current detector 334A (such as a high-frequency current sensor) respectively at a position between the primary winding 322A of the current transformer 322 and the first capacitor C1, and at a position between the primary winding 322A and the second capacitor C2, however, as shown in FIG. 6, the frequency currents can be detected between the primary winding 321A of the matching transformer 321 and the inverter 312. In other words, a switching section 800 (such as a switch) can be connected between the low-frequency current detector 333A/the high-frequency current detector 334A and the low-frequency synchronizing circuit 333/the high-frequency synchronizing circuit 334, so that, by switching operation with the switching section 800, the frequency synchronizing can be performed with the low-frequency synchronizing circuit 333 and the high-frequency synchronizing circuit 334 in the same manner as the first embodiment.

Also, in implementing the present invention, the detail structure and procedure can be varied within the scope of the workpiece of the present invention.

The invention claimed is:

1. An electric power supply apparatus for supplying electric power with different frequencies to an induction load to make the induction load work, comprising:

a generator that outputs AC electric power with different frequencies;

a matching circuit that constitutes, together with the induction load, a plurality of resonance circuits corresponding to the different frequencies; and a control circuit that controls the supply of the AC electric power output from the generator to one of the resonance circuits of the matching circuit so that the frequency of the AC electric power matches a predetermined resonance frequency, wherein the matching circuit comprises a transformer having a primary winding and a secondary winding, the primary winding being connected with the generator, the secondary winding and the induction load providing a plurality of series resonance circuits with an output frequency corresponding to different frequencies outputted by the generator, and the transformer converts a plurality of load resonance impedances to substantially equal oscillator output impedance.

2. The electric power supply apparatus according to claim 1, wherein the secondary winding has a tap which converts a plurality of different load resonance impedances to substantially equal oscillator output impedance.

3. The electric power supply apparatus according to claim 1, wherein the transformer includes a plurality of the transformers, the plurality of the transformers being provided for each of the resonance circuits which convert the load resonance impedance to the oscillator output impedance.

4. The electric power supply apparatus according to claim 1, wherein the control circuit is provided with a frequency electric power ratio controller which switches the frequency of the AC electric power output from the generator according to a condition in which the induction load works.

5. The electric power supply apparatus according to claim 4, wherein the frequency electric power ratio controller sets the frequency of the AC electric power output from the generator based on a set input signal concerning the condition in which the induction load works, the condition being set by an input operation from an input section.

6. The electric power supply apparatus according to claim 4, wherein the control circuit includes a low-frequency synchronizing circuit which controls the oscillation frequency of the generator so that an output frequency of the low-frequency electric power output from the generator becomes a predetermined series resonance frequency which is characteristic of impedance, a high-frequency synchronizing circuit which controls the oscillation frequency of the generator so that an output frequency of the high-frequency electric power output from the generator becomes a predetermined series resonance frequency which is characteristic of impedance, and the frequency electric power ratio controller which switches between the low-frequency and the high-frequency.

7. The electric power supply apparatus according to claim 1, wherein the control circuit is provided with a frequency electric power ratio controller which switches the frequency of the AC electric power output from the generator in unit of cycle.

8. The electric power supply apparatus according to claim 7, wherein the frequency electric power ratio controller is capable of changing a time ratio at which the respective frequencies are alternately output, based on the set input signal concerning the condition in which the induction load works, the condition being set by an input operation from a input section.

9. The electric power supply apparatus according to claim 1, wherein the control circuit controls the frequency of the AC electric power output from the generator based on a frequency current flowing in the resonance circuit.

10. The electric power supply apparatus according to claim 9, wherein the control circuit includes synchronous control circuits corresponding to each of the frequencies of the AC electric power supplied from the generator, and a storage for, when transiting to a quiescent period during which the AC electric power is not supplied from the generator with respect to a predetermined frequency, storing frequency information concerning the predetermined frequency, wherein when transiting to an operation period during which the AC electric power is supplied from the generator with respect to the predetermined frequency, the respective synchronous control circuit performs the synchronous control based on the frequency information as a synchronizing information stored in the storage.

11. The electric power supply apparatus according to claim 1, wherein the control circuit is provided with an output control circuit which changes the output of the AC electric power output from the generator.

12. The electric power supply apparatus according to claim 11, wherein the generator includes a converter circuit which converts the AC electric power to a predetermined DC electric power, and an inverse conversion circuit which converts the DC electric power converted by the converter circuit to a predetermined AC electric power, and wherein the output control circuit feedback-controls an output value of the DC current output from the converter circuit.

13. The electric power supply apparatus according to claim 1, wherein the generator is provided with an inverse conversion circuit which converts the DC electric power to a voltage square wave AC electric power.

14. An induction heating apparatus comprising:

an electric power supply apparatus for supplying electric power with different frequencies to an induction load to make the induction load work, and an induction heating coil which induction-heats a workpiece-to-be-heated with the electric power having different frequencies supplied from the electric power supply apparatus, wherein the induction heating apparatus comprises: a generator that outputs AC electric power with different frequencies; a matching circuit that constitutes, together with the induction load, a plurality of resonance circuits corresponding to the different frequencies; and a control circuit that controls the supply of the AC electric power output from the generator to one of the resonance circuits of the matching circuit so that the frequency of the AC electric power matches a predetermined resonance frequency, the matching circuit comprises a transformer having a primary winding and a secondary winding, the primary winding being connected with the generator, the secondary winding and the induction load providing a plurality of series resonance circuits with an output frequency corresponding to different frequencies outputted by the generator, and the transformer converts a plurality of load resonance impedances to substantially equal oscillator output impedance.

* * * * *